US008582559B2

(12) United States Patent
Matias et al.

(10) Patent No.: US 8,582,559 B2
(45) Date of Patent: Nov. 12, 2013

(54) SYSTEM AND METHOD FOR HANDLING MEDIA STREAMS

(75) Inventors: John P. Matias, Revere, MA (US); Ajay Punreddy, Tyngsboro, MA (US); Marc A. Snider, Merrimack, NH (US)

(73) Assignee: Aspect Software, Inc., Chelmsford, MA (US)

( * ) Notice: Subject to any disclaimer, the term of this patent is extended or adjusted under 35 U.S.C. 154(b) by 1537 days.

(21) Appl. No.: 11/888,987

(22) Filed: Aug. 2, 2007

(65) Prior Publication Data

US 2008/0031231 A1 Feb. 7, 2008

Related U.S. Application Data

(60) Provisional application No. 60/835,374, filed on Aug. 3, 2006.

(51) Int. Cl.
*H04L 12/66* (2006.01)
*H04L 12/16* (2006.01)

(52) U.S. Cl.
USPC .......... 370/352; 370/260; 370/353; 370/354; 370/355; 370/356

(58) Field of Classification Search
USPC .............. 370/352–356, 231, 230.1, 466, 471, 370/260; 379/69, 88.17, 201.01
See application file for complete search history.

(56) References Cited

U.S. PATENT DOCUMENTS

| | | | |
|---|---|---|---|
| 6,603,774 B1 * | 8/2003 | Knappe et al. ................ 370/466 |
| 8,019,371 B2 * | 9/2011 | Coulombe .................... 455/518 |
| 8,144,693 B1 * | 3/2012 | Robbins ........................ 370/352 |
| 2001/0034784 A1 * | 10/2001 | Holler et al. ................... 709/223 |
| 2003/0088421 A1 * | 5/2003 | Maes et al. .................. 704/270.1 |
| 2005/0083912 A1 * | 4/2005 | Afshar et al. ................. 370/352 |
| 2005/0094625 A1 * | 5/2005 | Bouat ........................... 370/352 |
| 2005/0100001 A1 * | 5/2005 | Liu ............................... 370/352 |
| 2006/0126596 A1 * | 6/2006 | Shieh et al. .................... 370/352 |
| 2006/0126664 A1 | 6/2006 | Horton |
| 2006/0165068 A1 * | 7/2006 | Dalton et al. ................. 370/352 |
| 2006/0256771 A1 * | 11/2006 | Yarlagadda ................... 370/352 |
| 2007/0153776 A1 * | 7/2007 | Joseph et al. ................. 370/356 |

FOREIGN PATENT DOCUMENTS

EP 1148690 A1 10/2001
EP 1562359 A2 8/2005

OTHER PUBLICATIONS

International Search Report for Application No. PCT/US2007/017378, dated Feb. 6, 2008.

* cited by examiner

*Primary Examiner* — Luat Phung
*Assistant Examiner* — Kai Chang
(74) *Attorney, Agent, or Firm* — Husch Blackwell LLP

(57) ABSTRACT

A mechanism for managing and enhancing communication streams in a VOIP service using SIP is discussed. SIP is used to manage and enhance a communication stream at a centralized switching element in the VoIP environment rather than at the communication stream endpoints. The communication stream set up by SIP is directed through a central switching element under administrative control rather than traveling directly between the stream endpoints. As a result, the media stream may be conditioned with treatments and may be provided with enhanced services at the central switching element without the specific treatments and services being supported at both stream endpoints. The use of the centralized switching element allows full administrative control of the VoIP environment.

15 Claims, 4 Drawing Sheets

SYSTEM AND METHOD FOR HANDLING MEDIA STREAMS

RELATED APPLICATION

This application claims priority to U.S. Provisional Patent Application Ser. No. 60/835,374, filed Aug. 3, 2006, the contents of which are hereby incorporated by reference.

FIELD OF THE INVENTION

The illustrative embodiment of the present invention relates generally to a Voice over Internet Protocol (VoIP) environment, and more particularly to a method of managing and enhancing communication streams in a VoIP environment.

BACKGROUND

The Voice over Internet Protocol (VoIP) is a protocol that allows a user to make telephone calls using an Internet connection rather than a traditional analog telephone connection. With VoIP, the caller's voice signal is converted from an analog signal into a digital signal carried by IP packets that travel over the Internet. The digital signal is then converted back into a voice analog signal at the other end so that the caller can speak with a called party. VoIP uses the Internet as the transmission medium for telephone calls by sending voice data in packets using IP rather than by traditional circuit transmissions of the Public Switched Telephone Network (PSTN).

The Session Initiation Protocol (SIP) is a protocol used in VOIP network environments. SIP is a signaling and call setup protocol for IP-based communications. SIP has also been used to enable networks to implement many call processing features such as dialing sounds, causing a phone to ring and busy signals that provide the illusion of a normal telephone operation. Unfortunately, the use of SIP to provide these and other calling features have required intelligent call endpoints that support the use of SIP to support the same features. It would be desirable to use SIP to manage the creation and treatment of communication streams in a VOIP environment from a centralized location in the communication network so that features are not required to be supported at both call endpoints.

BRIEF SUMMARY

The illustrative embodiment of the present invention provides a mechanism for managing and enhancing communication streams in a VOIP service using SIP. In contrast to conventional techniques, the present invention allows the use of SIP to manage the creation and treatment of a communication stream at a centralized switching element in the VoIP environment rather than at the communication stream endpoints. The communication stream established using the SIP protocol is directed and connected through a central switching element under administrative control rather than traveling directly between the stream endpoints as in peer to peer communication. As a result, the media stream may be conditioned with treatments and may be provided with enhanced services at the central switching element without the specific treatments and services being supported at both stream endpoints. The use of the centralized switching element allows full administrative control of the VoIP environment.

In one aspect of the present invention, a computer-implemented method for managing and enhancing communication streams in a VoIP environment includes the step of establishing, with a control module, a communication stream between a calling unit and a called unit. The method also provides at least one relay module. The control module directs the communication stream through the at least one relay module. The method additionally manages, from the control module, the communication stream passing through the at least one relay module. The managing of the communication stream uses SIP.

In another aspect of the present invention, a computer-implemented system for managing and enhancing communication streams in a VoIP environment includes a calling unit on a first computing device. The system also includes a called unit on a second computing device. The second computing device is accessible to the first computing device over a network. The system additionally includes a control module that establishes a communication stream between the calling unit and the called unit and at least one relay module. The communication stream is directed and connected through at least one relay module by the control module and is managed at the relay module by the control module. The managing of the communication stream uses SIP.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The illustrative embodiment of the present invention allows a communication stream in a VoIP environment to be managed and enhanced from a single intermediate point in the communication stream. A communication session is established by a control module and the resulting communication stream is directed and connected through a software relay module. The control module uses SIP to communicate with the relay module and manage the communication stream. More specifically, the control module uses SIP to send directives to the relay module to create communication streams and apply optional treatments. Because both the control module and the relay module support SIP, the communication stream may be conditioned and enhanced using SIP services even though one or both endpoints do not support an identical set of media related features such as recording, voice and video transcoding, lawful intercept and statistics gathering and communication stream enhancements such as packet loss concealment.

Figure 1:
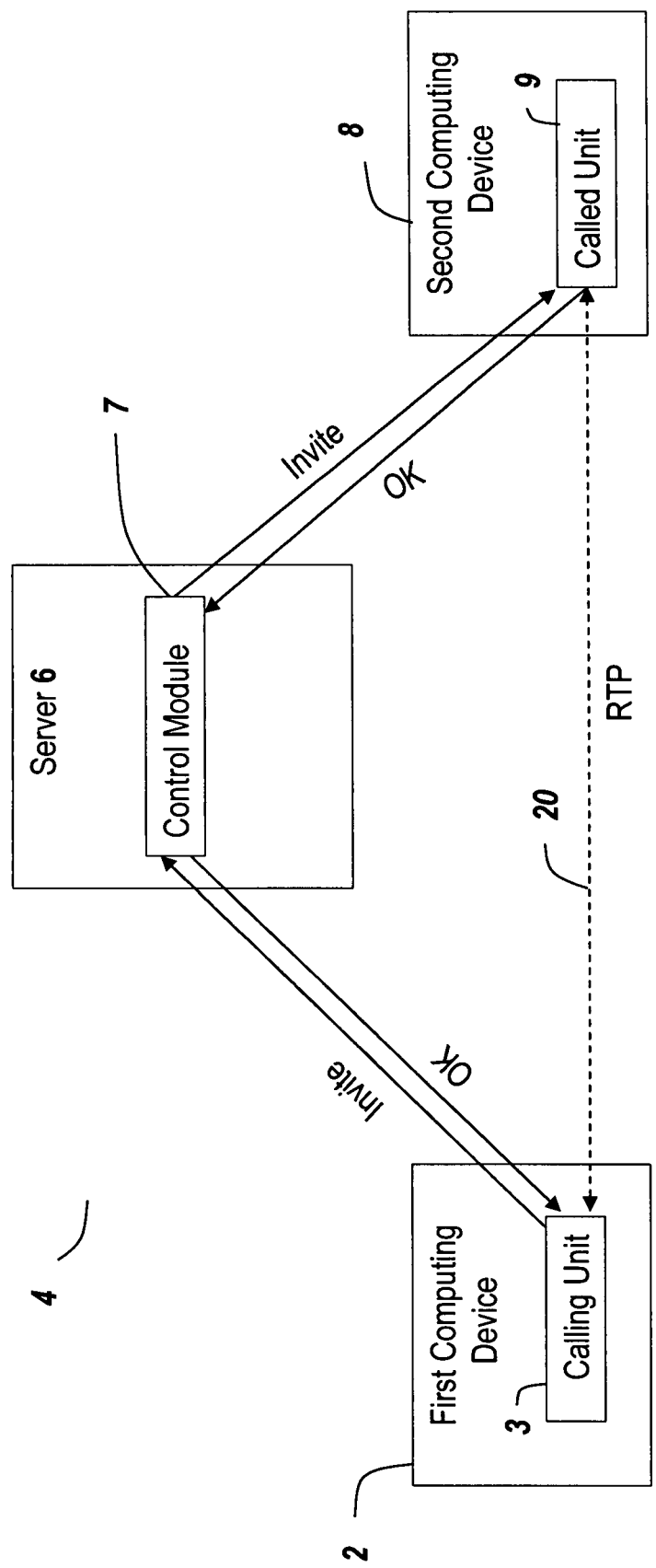
FIG. 1 (prior art) depicts a conventional VOIP environment.

In order to better explain the present invention, a conventional VoIP environment will first be discussed. FIG. 1 depicts an exemplary conventional VoIP environment. A first computing device 2 interfaced with a network 4 includes or is accessible by a calling unit 3. The calling unit 3 may be a physical device such as a phone or alternatively may be a software process providing communication features. It will be appreciated that the phone itself may be equipped with a processor and capable of directly accessing and sending digital communications over the network 4. Alternatively the calling unit may be a conventional analog phone that is connected to the first computing device via an analog telephone adapter that converts the analog signal of the phone into a digital signal before transmitting the signal over the network 4. In the exemplary VoIP environment, the calling unit 3 sends a call or communication request to a control module 7 that is executing on a server 6 in the network 4. The control module 7 is a control agent that has access to registrar and location databases. The control module 7 checks the database to determine the location of the called unit 9 on a second computing device 8 interfaced with the network 4. A connection request is sent to the called unit 9 by the control module 7. If the called unit 9 is available, an acknowledgement is sent back to the control module 7 and forwarded to the calling unit 7. The control module also passes on information to both the calling unit 3 and the called unit 9 enabling the formation of a session utilizing a communication stream 20 that is bi-directionally transmitted between the calling unit 3 and the called unit 9. The communication stream 20 may use RTP (Real Time Transport Protocol) or a similar transport protocol to transport the voice, video or other data over the network 4.

If both the calling unit 3 and the called unit 9 support the SIP protocol, the control module 7 may use the Session Initiation Protocol (SIP) to establish and tear down call sessions. With SIP, the calling unit 3 sends an initial invitation identifying the called unit 9 to the control module 7. The invitation includes the Session Description Protocol (SDP) for the calling unit 3. The SDP describes the media content of the desired session. For example, the SDP describes what IP ports to use in the session and the desired codecs. The control module 7 may authenticate the user of the calling unit 3 that is initiating the invitation before taking additional action. An invitation message which includes the SDP of the calling unit 3 is then sent by the control module 7 to the called unit 9. If the called unit 9 is able to take the call, an acknowledgement is sent back to the control module 7 with the SDP of the called unit 9. The control module 7 forwards the acknowledgement to the calling unit along with the SDP of the called unit 9 that contains the necessary codec and port information so that the calling unit 3 and the called unit 9 can thereafter communicate directly. If both the calling unit and the called unit support the same SIP features, those features may be implemented in the established communication session. In the conventional VoIP environment, if either the calling unit 3 or called unit 9 fail to support a particular SIP feature, that particular feature may not be used in the communication session.

Figure 2:
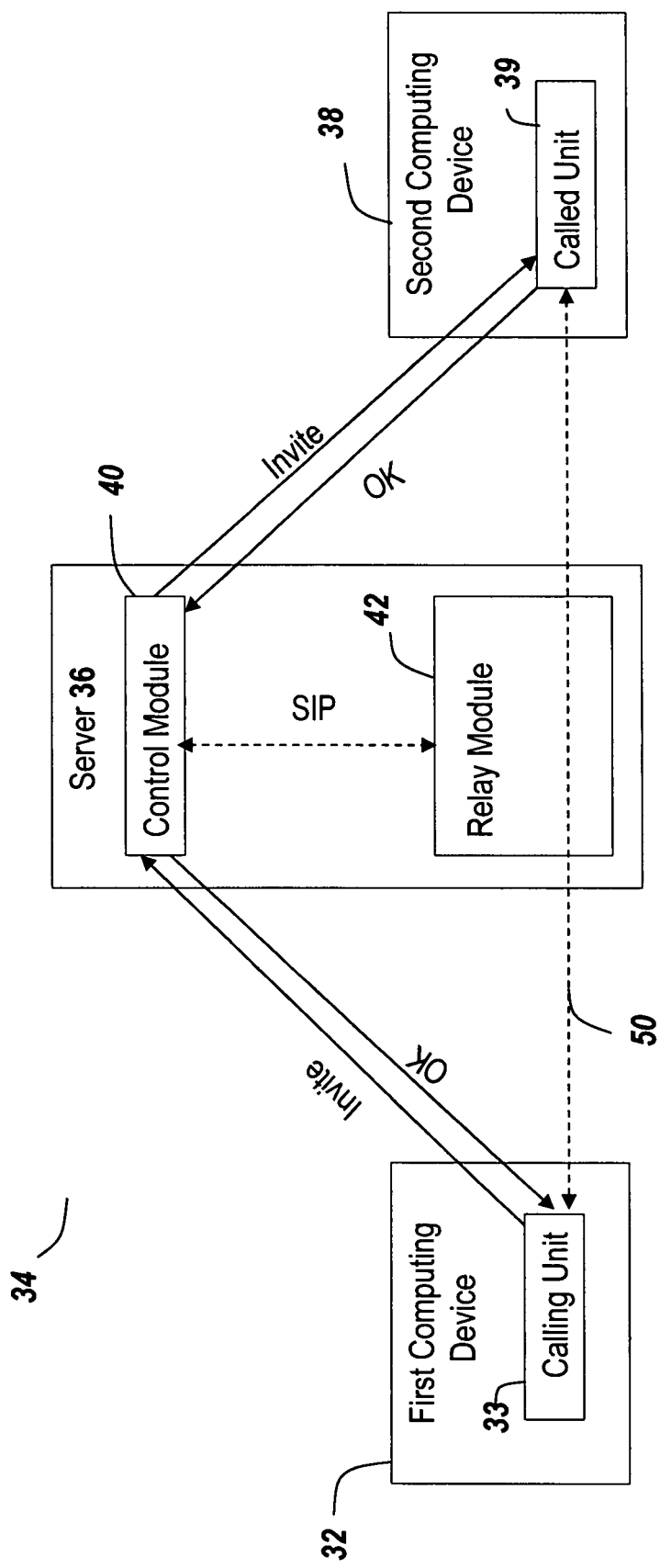
FIG. 2 depicts an environment suitable for practicing the illustrative embodiment of the present invention.
Figure 3:
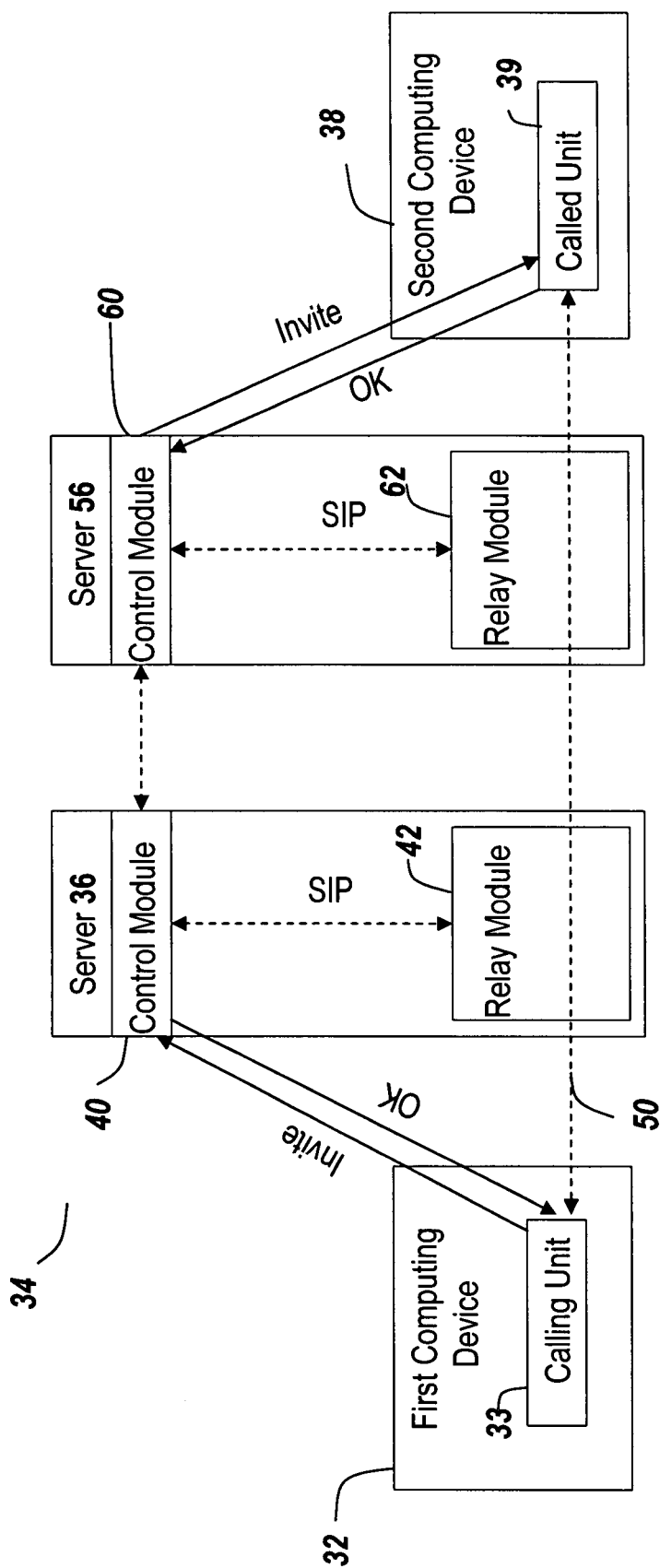
FIG. 3 depicts an alternate environment that is also suitable for practicing the illustrative embodiment of the present invention.

The present invention removes the requirement that the calling endpoints both support a particular SIP feature in order to utilize that feature in a communication session. FIGS. 2 and 3 depict exemplary environments suitable for practicing the illustrative embodiment of the present invention. With regard to FIG. 2, a calling unit 33 executing on or in communication with a first computing device 32 sends a communication invitation (hereafter referred to herein as a "call invitation") identifying a called unit 39 executing on or in communication with a second computing device 38. The call invitation is sent over a network 34 to a control module 40. The first and second computing devices 32 and 38 may be a workstation, server, laptop, PDA, IP-enabled phone or other computing device equipped with a processor and able to establish a communication session over the network 34. The calling unit 33 and called unit 39 may be analog phones, digital phones or software processes providing communication features. The network 34 may be the Internet, a Local Area Network (LAN), a Wide Area Network (WAN), a wireless network, or some other type of network over which the first computing device 32, second computing device 38 and server 36 can communicate. For illustration purposes, the control module 40 is depicted as executing on a server 36 although it should be appreciated that the control module may also operate on other types of computing devices. The control module 40 establishes the communication session between the first computing device and second device as requested by the invitation. Upon receiving the invitation request from the calling unit 33, the control module 40 determines whether the called unit 39 is available. In the event the called unit 39 is available for the requested communication session, the control module provides port and codec information of a software relay module 42 through which the communication stream 50 for the session will bi-directionally pass. Both the control module 40 and the relay module 42 support the use of SIP. It should be appreciated that while the relay module 42 is depicted for ease of illustration as being executed on the same server 36 as the control module 40, the relay module 42 may also be located on a different computing device in the network 34.

Because both the control module 40 and relay module 42 support identical SIP features, the communication stream 50 may be conditioned and enhanced with both well-known and/or new features even when particular features are not supported by a one or both of the call endpoints for the communication stream 50. For example, the communication stream 50 may be conditioned so that transcoding is applied to the communication stream to change the data from one format to another as it passes through the relay module 42 so that it will be compatible with the receiving calling unit or called unit. Exemplary enhanced services which may be applied to the communication stream 50 at the relay module 42 include call recording (by storing the packets passing through the relay module), the application of global policy information for the stream so as to provide consistent packet marking and handling, and the application of enhanced speech processing technologies such as packet loss concealment. Lawful intercepts may also occur at the relay module 42 and statistics may be gathered. It will be appreciated that many other features may similarly be applied to the communication stream 50 at the relay module 42. As a result of the communication between the control module 40 and the relay module 42, the control module has access to a single point (the relay module) from which to manage and enhance the communication stream.

FIG. 3 depicts an additional environment in which the illustrative embodiment of the present invention may be practiced. A second server (or other computing device) 56 is added to the network 34 discussed in FIG. 2 and is in communication with the first server 36 executing the control module 40. The second server 56 includes a second control module 60 and second relay module 62. The second control module 60 may be used in both the establishment of the communication session between the calling unit 33 and the called unit 39 and in management of the communication stream 50. The communication stream 50 may be directed to pass between one or both of the relay modules 42 and 62. It should be appreciated that alternate environments with additional control modules and relay modules are also within the scope of the present invention.

Figure 4:
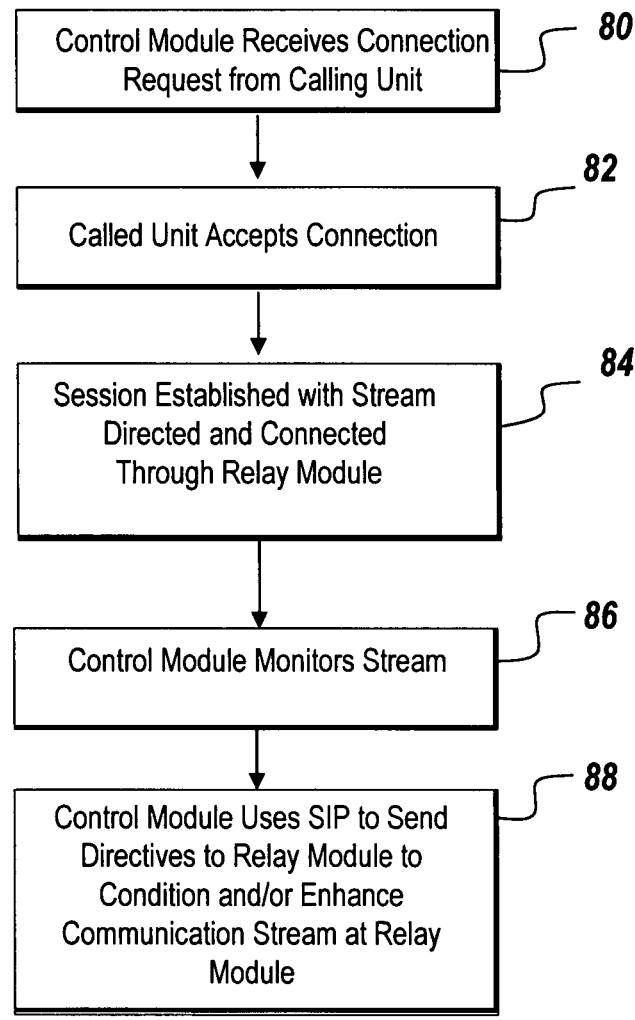
FIG. 4 is a flowchart of the sequence of steps followed by the illustrative embodiment to manage and enhance communication streams.

FIG. 4 is a flowchart of a sequence of steps that may be followed by the illustrative embodiment of the present invention in order to enhance and manage a communication stream.

The sequence begins when the control module receives a connection request from the calling unit (step 80). When the called unit accepts the connection (step 82) a session is established with the communication stream being directed through the relay module (step 84). The control module is in communication with the relay module through which the communication stream passes and may monitor the stream (step 86). The control module uses SIP to send directives to the relay module to condition and/or enhance the communication stream at the relay module (step 88).

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computer-implemented method for managing and enhancing communication streams in a VoIP environment, the method comprising the steps of:
    establishing, with a control module that supports a plurality of Session Initiation Protocol (SIP) features, a communication stream between a calling unit and a called unit;
    the control module directing the communication stream to pass bi-directionally through at least one relay module that supports the plurality of SIP features;
    managing, from the control module, the communication stream passing through the at least one relay module, the managing of the communication stream performed by the control module by sending directives using SIP to the at least one relay module to condition the communications stream at the at least one relay module with at least one feature of the plurality of SIP features which is not supported by at least one of the called unit and the calling unit; and
    providing an enhanced service which is not supported by the at least one of the calling unit and the called unit to the communication stream at the at least one relay module using SIP, wherein the enhanced service is at least one of a call recording, an application of global policy information, and an application of an enhanced speech processing technology, and wherein the control module establishes the communications stream, after determining the called unit is available in response to a communications invitation received from the calling unit identifying the called unit, by providing port and codec information of the at least one relay module.

2. The computer-implemented method of claim 1, further comprising:
    conditioning the communication stream at the at least one relay module using SIP.

3. The computer-implemented method of claim 2 wherein the communication stream is transcoded to change the communications stream from one format to another as the communication stream passes through the at least one relay module.

4. The computer-implemented method of claim 1 wherein the application of the enhanced speech processing technology provides packet loss concealment for the communication stream.

5. A computer-implemented system for managing and enhancing communication streams in a VoIP environment, comprising:
    a first computing device having a calling unit;
    a called unit on a second computing device, the second computing device accessible over a network by the first computing device;
    a control module that supports a plurality of Session Initiation Protocol (SIP) features, the control module configured to establish a bi-directional communication stream between the calling unit and the called unit;
    at least one relay module that supports the plurality of SIP features, the bi-directional communication stream directed through the at least one relay module by the control module, the bi-directional communication stream being managed at the at least one relay module by the control module, the managing of the bi-directional communication stream performed by the control module by sending directives using SIP to the at least one relay module to condition the bi-directional communications streams at the at least one relay module with at least one SIP feature of the plurality of SIP features which is not supported by at least one of the called unit and the calling unit; and
    the control module provides an enhanced service which is not supported by the at least one of the calling unit and the called unit to the communication stream at the at least one relay module using SIP, wherein the enhanced service is at least one of a call recording, an application of global policy information, and an application of an enhanced speech processing technology, and wherein the control module establishes the communications stream, after determining the called unit is available in response to a communications invitation received from the calling unit identifying the called unit, by providing port and codec information of the at least one relay module.

6. The computer-implemented system of claim 5 wherein the bi-directional communications stream is conditioned at the at least one relay module using SIP.

7. The computer-implemented system of claim 5 wherein statistics are compiled about the bi-directional communications stream by monitoring the bi-directional communications stream at the relay module.

8. The computer-implemented system of claim 7 wherein the statistics track packet loss in the bi-directional communications stream.

9. The computer-implemented system of claim 7 wherein the statistics track jitter in the bi-directional communications stream.

10. The computer-implemented system of claim 5 wherein the computer-implemented system includes at least two relay modules and the bi-directional communications stream is passed between the at least two relay modules.

11. A non-transitory computer readable medium for use with a computing device, the non-transitory computer readable medium holding computer-executable instructions for managing and enhancing communication streams in a VoIP environment, the instructions comprising:

instructions for establishing, with a control module that supports a plurality of SIP features, a communication stream between a calling unit and a called unit;

instructions for providing at least one relay module that supports the plurality of SIP features, the control module directing the communication stream to pass through the at least one relay module;

instructions for managing, from the control module, the communication stream passing through the at least one relay module, the managing of the communication stream performed by the control module by sending directives using SIP (Session Initiation Protocol) to the at least one relay module to condition the communications stream with at least one feature of the plurality of SIP features which is not supported by at least one of the calling unit and the called unit; and instructions for providing an enhanced service which is not supported by the at least one of the calling unit and the called unit to the communication stream at the at least one relay module using SIP, wherein the enhanced service is at least one of a call recording, an application of global policy information, and an application of an enhanced speech processing technology, and wherein the control module establishes the communications stream, after determining the called unit is available in response to a communications invitation received from the calling unit identifying the called unit, by providing port and codec information of the at least one relay module.

12. The non-transitory computer readable medium of claim 11, the instructions further comprising: instructions for conditioning the communication stream at the at least one relay module using SIP.

13. The non-transitory computer readable medium of claim 12 wherein the communication stream is transcoded.

14. The non-transitory computer readable medium of claim 11 wherein the application of global policy information affects packet marking and handling.

15. The non-transitory computer readable medium of claim 11 wherein the application of the enhanced speech processing technology provides packet loss concealment for the communication stream.

* * * * *